B. M. CLINEDINST.
Improvement in Photographic-Cameras.
No. 129,104. Patented July 16, 1872.
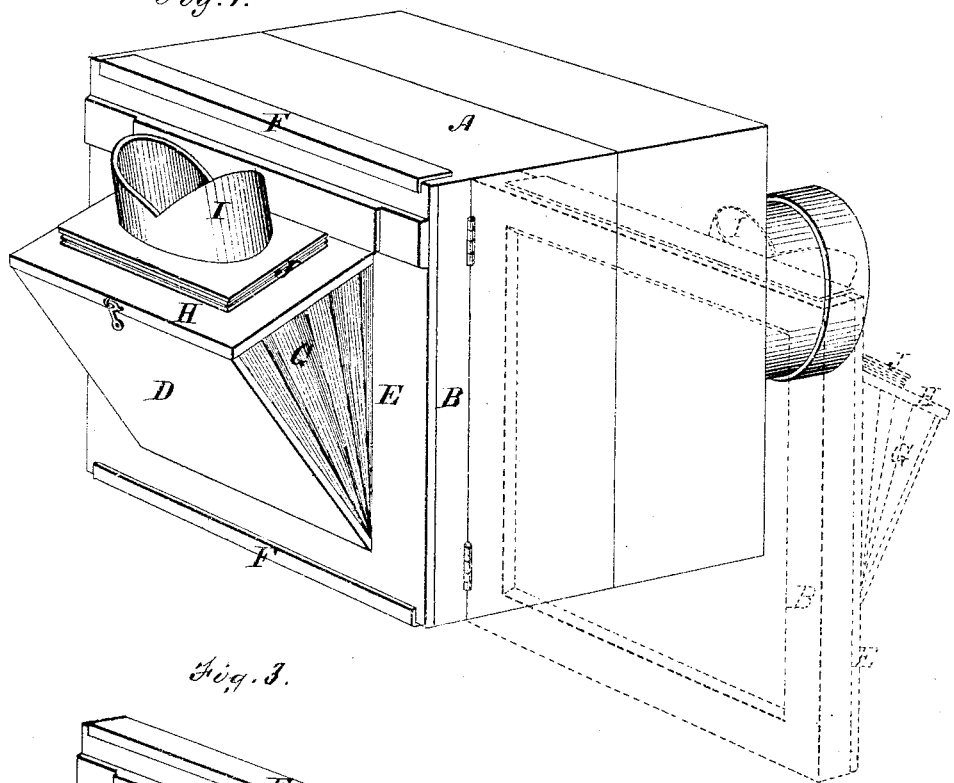
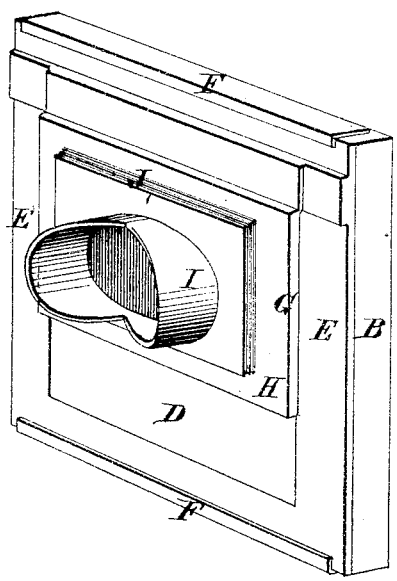
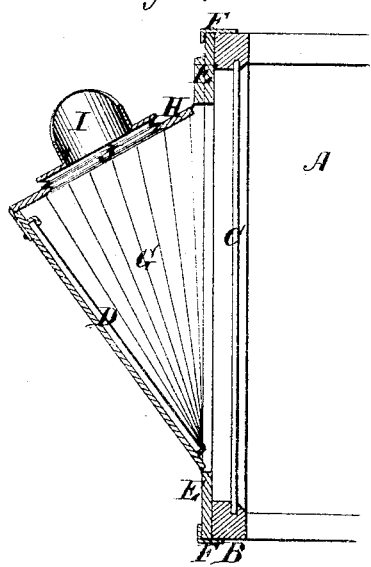
Witnesses.
C. F. Brown
M. Church
Inventor.
B. M. Clinedinst,
By Hill & Ellsworth
his Attys.

UNITED STATES PATENT OFFICE.

BARNETT M. CLINEDINST, OF STAUNTON, VIRGINIA.

IMPROVEMENT IN PHOTOGRAPHIC CAMERAS.

Specification forming part of Letters Patent No. 129,104, dated July 16, 1872.

*To all whom it may concern:*

Be it known that I, BARNETT M. CLINEDINST, of Staunton, in the county of Augusta and State of Virginia, have invented a new and useful Improvement in Photographic Apparatus; and I do hereby declare the following to be a full, clear, and exact description of the same, reference being had to the accompanying drawing forming part of this specification, in which—

Figure 1 is a perspective view of my improvements applied to a camera. Fig. 2 is a central vertical section of the same; and Fig. 3 is a perspective view, showing the attachments folded up.

Similar letters of reference in the accompanying drawing indicate the same parts.

All photographic cameras heretofore in use have been constructed in such a manner that an image or picture formed at any point behind the lens is always inverted. From this cause the operator, who can only see the inverted picture, is subjected to great difficulty and uncertainty in deciding whether the sitter is in the proper position, and in judging of the effect of light and shade in the picture to be taken, all of which difficulty and uncertainty would be obviated if the object could be viewed in its natural, upright position. Another inconvenience is also experienced in connection with the cameras heretofore constructed—namely, the necessity of using a cloth to exclude the light from the top while the operator is adjusting the instrument preparatory to taking a picture.

The oject of my invention is to obviate these difficulties, and to this end it consists, first, in the employment of a reflector to reverse the inverted image and enable the operator to see it in its natural position while focusing and adjusting the instrument; secondly, in the adaptation of an improved shade to take the place of the loose cloth heretofore employed; and thirdly, in the construction and arrangement of the reflector, shades, and other parts connected therewith, in such a manner that they can readily and conveniently be adjusted at the will of the operator, as I will now proceed to describe.

In the accompanying drawing, A is a camera of the usual form, and B is a frame hinged to its rear end so as to carry the ground glass C. D is the reflector hinged to the lower part of a second frame, E, which is adapted to slide laterally between guides F at the back of the ground-glass frame. The reflector is made of such size as to fill or nearly fill the opening of the frame E, and its ends are attached to the latter by the bellows or other suitable flexible or elastic connections G. H is the hood-frame hinged to the upper part of the frame E, in such a manner that when swung outward its free edge can be hooked or otherwise connected to the upper edge of the reflector so as to cover the opening above the latter, as shown in Fig. 1. I is the hood attached to the top of the frame H by a bellows or other adjustable connection, J, so as to enable the operator to adjust the focal distance in viewing the reflector through the hood.

When the reflector and its attachments are applied to a camera preparatory to taking a picture, the inverted image from the ground glass is reflected in its natural upright position upon the reflector, and is seen by the operator through the hood, the sides of the latter, together with the inclosing sides and top of the reflector, affording the necessary shade. By this construction the operator is enabled to determine the pose of the sitter, the arrangement of drapery, &c., and the different effects of light and shade, in the most accurate and complete manner to produce the most artistic and natural results in the picture. The flexible connections of the reflector with the frame enable the former to be adjusted to the requisite angle with respect to the ground glass.

I have found, in practice, that an angle of about forty-two degrees produces good results, although I do not limit the adjustment to that or any other angle. Neither do I limit myself to the use of my improvements upon a swinging frame carrying the ground glass, as they may be applied to a camera without the frame, or to one in which the ground glass is used as a slide. The attachment may be moved in the guides F to the right or left of the ground glass for the purpose of adjusting the reflector and shade to suit the position of the object reflected. The various adjustments are produced in the simplest and most expeditious manner, with but little effort upon the part of the operator.

When the attachments are not required for use they may be folded up out of the way by disconnecting the reflector and hood-frame and folding one over the other, as shown in Fig. 3. Access may be had to the ground glass and reflector at any time by swinging open the frame B, as shown by dotted lines, Fig. 1.

Having thus described my invention, what I claim is—

1. A reflector for photographic cameras, combined with a folding frame or case attached to the ground-glass frame by suitable guides, substantially as described, for the purpose specified.

2. The camera-shade formed by the reflector, the hood, and their connecting parts, substantially as described.

3. In combination with a photographic camera, I claim a hinged frame carrying an adjustable shade and reflector, substantially as described, for the purpose specified.

4. The shade and reflector adapted for simultaneous lateral adjustment at the rear of the camera, to suit the position of the object reflected, substantially as described.

BARNETT M. CLINEDINST.

Witnesses:
N. K. ELLSWORTH,
M. CHURCH.